(12) United States Patent
Orsley

(10) Patent No.: US 7,940,253 B2
(45) Date of Patent: May 10, 2011

(54) METHOD AND SYSTEM FOR SCREEN NAVIGATION

(75) Inventor: Timothy J. Orsley, San Jose, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1071 days.

(21) Appl. No.: 11/506,478

(22) Filed: Aug. 17, 2006

(65) Prior Publication Data

US 2008/0042998 A1    Feb. 21, 2008

(51) Int. Cl.
*G06F 3/043* (2006.01)

(52) U.S. Cl. ........................................ 345/177; 345/173

(58) Field of Classification Search ........... 345/173–179
See application file for complete search history.

(56) References Cited

U.S. PATENT DOCUMENTS

| | | | |
|---|---|---|---|
| 4,246,439 A | | 1/1981 | Romein |
| 4,814,552 A * | | 3/1989 | Stefik et al. ............... 178/19.02 |
| 5,012,049 A * | | 4/1991 | Schier ........................ 178/19.06 |
| 5,612,720 A * | | 3/1997 | Ito et al. ........................ 345/179 |
| 5,883,338 A * | | 3/1999 | Trunck et al. .............. 178/19.07 |
| 5,986,224 A * | | 11/1999 | Kent ............................ 178/18.04 |
| 6,414,673 B1 * | | 7/2002 | Wood et al. ................... 345/173 |
| 6,577,299 B1 * | | 6/2003 | Schiller et al. ................ 345/179 |
| 6,630,929 B1 * | | 10/2003 | Adler et al. .................... 345/177 |
| 6,906,703 B2 * | | 6/2005 | Vablais et al. ................. 345/179 |
| 7,123,239 B1 * | | 10/2006 | Lapstun et al. ................ 345/156 |
| 2003/0050075 A1 * | | 3/2003 | Rangarajan et al. .......... 455/456 |
| 2005/0093830 A1 * | | 5/2005 | Li et al. ......................... 345/173 |
| 2006/0240814 A1 * | | 10/2006 | Cutler .......................... 455/423 |
| 2007/0070046 A1 * | | 3/2007 | Sheynblat et al. ............ 345/173 |

* cited by examiner

*Primary Examiner* — Alexander Eisen
*Assistant Examiner* — Nelson Lam

(57) ABSTRACT

A screen system includes a display, three or more sensors, a processor connected to the display and the three or more sensors, and a clock connected to the processor. When a position on a display is selected by a stylus that includes one or more emitters, the one or more emitters each emit a pulse or a series of pulses. Each sensor generates a receive message when the sensors receive a pulse. Each receive message includes an identifier identifying which sensor transmitted the receive message. The processor then determines the location of the emitter or emitters in the stylus and the position on the display using the sensor identifiers and a respective time associated with each receive message.

19 Claims, 7 Drawing Sheets

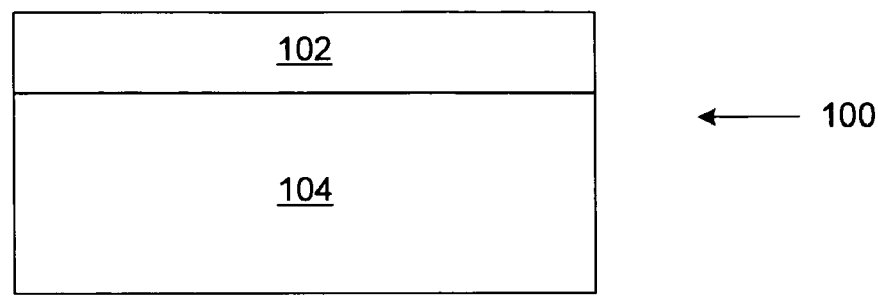
FIG. 1 – Prior Art
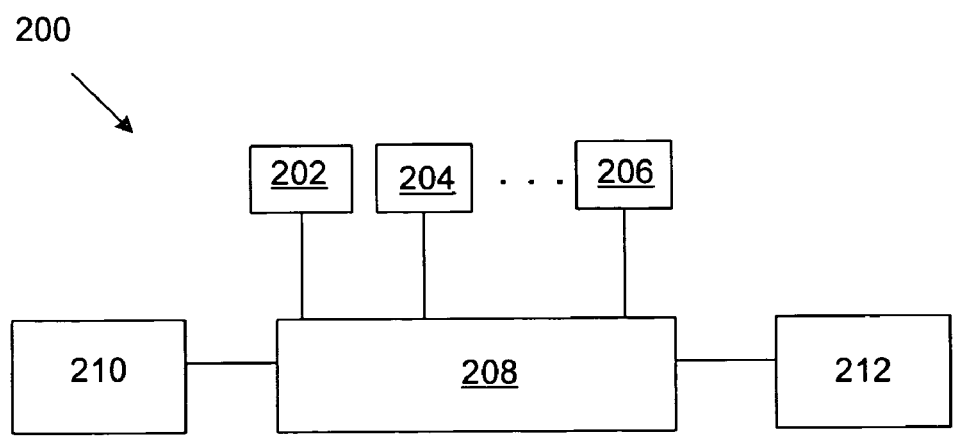
FIG. 2

METHOD AND SYSTEM FOR SCREEN NAVIGATION

BACKGROUND

Touchscreens are used in a number of data processing devices. Examples of such data processing devices include touchscreen kiosks, point of sale systems, personal digital assistants, and tablet PCs. Various types of touchscreen technologies can be used to display information to a user and allow the user to interact or manipulate data displayed on the touchscreen. FIG. 1 is a block diagram of a touchscreen system according to the prior art. Touchscreen 100 includes display 102 with overlay 104 covering the screen of display 102. Overlay 104 can be implemented as one of several different types of overlays, including a pressure-sensitive overlay, an electrically-sensitive overlay, or photosensitive overlay.

A pressure-sensitive or resistive overlay is implemented with an electrically conductive and resistive metallic layer covering a glass panel. An electric field is disrupted when a user touches the screen. This disruption is used to determine the location on the display that was touched by the user.

An electrically-sensitive or capacitive overlay is implemented as a capacitive layer that stores an electrical charge. When a user touches the display, charge is transferred to the user's finger causing a reduction in the charge on the capacitive layer at the spot touched by the user. This reduction is measured by circuits located at each corner of display 102. The location where the user touched display 102 is determined using the relative differences in charge at each corner.

A photosensitive or optical imaging overlay is implemented with image sensors placed around two edges of display 102. Light sources are placed on the edges of display 102 that oppose the edges with the image sensors. When a user touches the display, the touch is captured by the image sensors as a shadow or dark spot and each pair of image sensors can then be triangulated to locate the spot on display 102 touched by the user.

Unfortunately, overlay 104 can reduce the visibility and clarity of an image displayed on display 102. And all three of these techniques must be touched with a finger or stylus only at the desired point of contact. If a user inadvertently rests his or her hand or wrist on the touchscreen, the touchscreen can incorrectly interpret this contact as an intentional point of contact. This erroneous interpretation by the touchscreen can result in mistakes during data entry or data processing. And finally, the size of overlay 104 increases as the size of display 102 increases. This increases the cost to construct and maintain a touchscreen system.

SUMMARY

In accordance with the invention, a method and system for screen navigation are provided. A screen system includes a display, three or more sensors, a processor connected to the display and the three or more sensors, and a clock connected to the processor. In one embodiment in accordance with the invention, the stylus includes an emitter that emits one or more pulses when the tip of the stylus selects a position on the display by touching the screen. In another embodiment in accordance with the invention, the screen system includes four or more sensors and the stylus includes two emitters that each alternately emits one or more pulses when the tip of the stylus is pointed at a position on the display.

Each sensor generates a receive message when the sensors receive the pulse. Each receive message includes an identifier identifying which sensor transmitted the receive message. A time is associated with each receive message. A sensor associates a time with a receive message by including in the receive message the time at which the sensor received the pulse in an embodiment in accordance with the invention. In another embodiment in accordance with the invention, the processor associates a time with each receive message. For example, the processor associates a time with a message when the processor receives each message.

The processor then determines the location of the emitter or emitters in the stylus and the position on the display using the sensor identifiers and their respective associated times. By way of example only, Time-Of-Arrival (TOA) and Time-Difference-Of-Arrival (TDOA) are position-determining methods that may be used by the processor to determine the location of the stylus on the screen and the location of the two emitters and the selected position on the display when the stylus is pointing to a position on the screen.

BRIEF DESCRIPTION OF THE DRAWINGS

FIG. 1 depicts a block diagram of a touchscreen system according to the prior art;

FIG. 2 illustrates a block diagram of a screen system in an embodiment in accordance with the invention;

DETAILED DESCRIPTION

Figure 3:
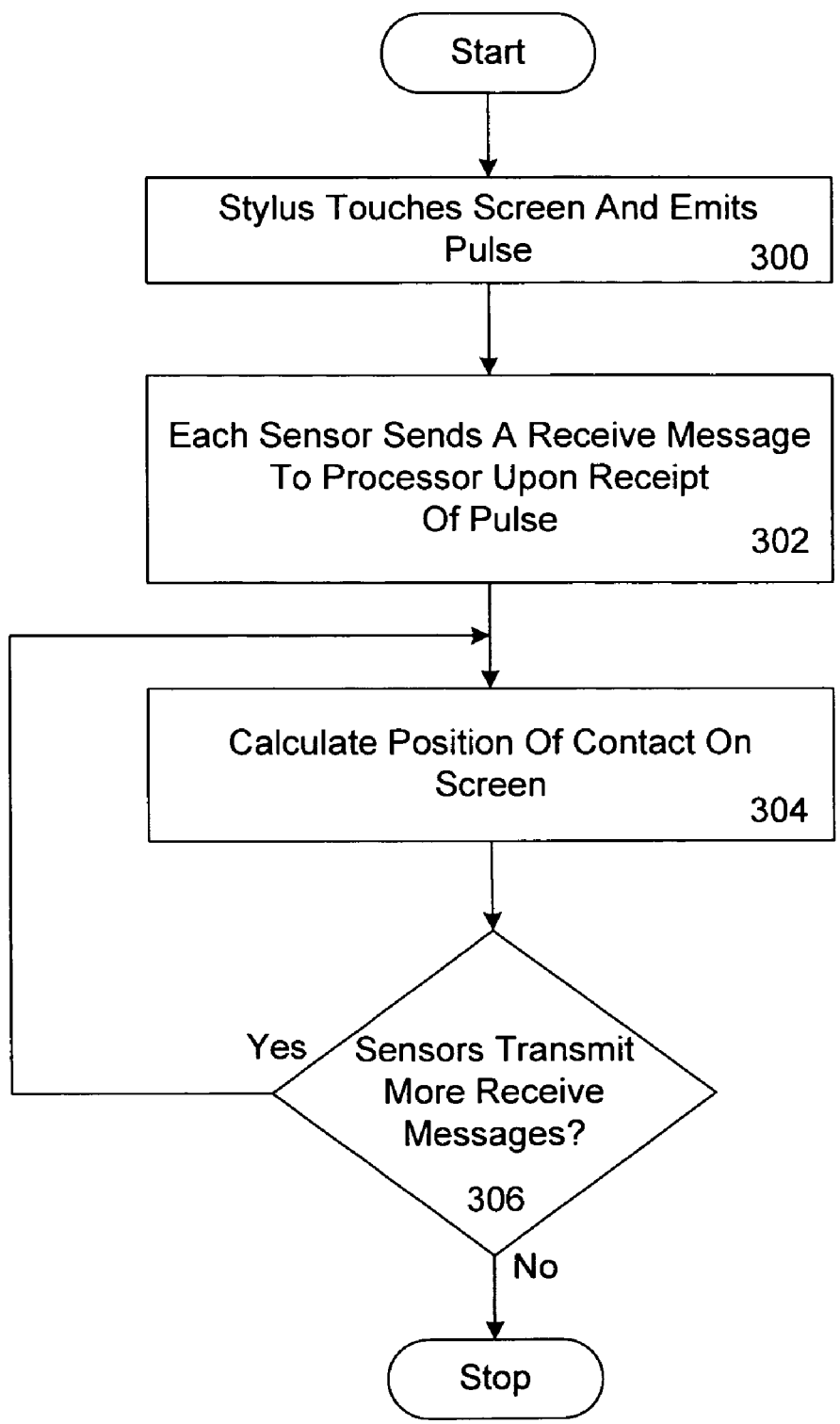
FIG. 3 depicts a flowchart of a first method for screen navigation in an embodiment in accordance with the invention.

The following description is presented to enable embodiments of the invention to be made and used, and is provided in the context of a patent application and its requirements. Various modifications to the disclosed embodiments will be readily apparent, and the generic principles herein may be applied to other embodiments. Thus, the invention is not intended to be limited to the embodiments shown but is to be accorded the widest scope consistent with the appended claims. Like reference numerals designate corresponding parts throughout the figures.

Referring now to FIG. 2, there is shown a block diagram of a screen system in an embodiment in accordance with the invention. Screen system 200 includes sensors 202, 204, 206, processor 208, clock 210, and memory 212. The ellipses between sensors 204, 206 indicate that additional sensors can be included in other embodiments in accordance with the invention.

Sensors 202, 204, 206 are synchronized to a common time based on clock 210 in an embodiment in accordance with the invention. Sensors 202, 204, 206 can be time synchronized using any known synchronization scheme, including, but not limited to, Network Time Protocol (NTP) and IEEE 1588. In another embodiment in accordance with the invention, sensors 202, 204, 206 are not time synchronized to a common time and processor 208 associates timing information to data received from sensors 202, 204, 206.

Processor 208 determines the position of a stylus that is touching a screen (not shown) in an embodiment in accordance with the invention. In another embodiment in accordance with the invention, processor 208 determines the location in space of a stylus. Time-Of-Arrival (TOA) and Time-Difference-Of-Arrival (TDOA) are examples of two position-determining methods used to calculate the position or location of the stylus.

FIG. 3 is a flowchart of a first method for screen navigation in an embodiment in accordance with the invention. Initially, a stylus touches a screen and in response emits one or more pulses, as shown in block 300. In one embodiment in accordance with the invention, the emitter is an ultrasonic emitter and the sensors are microphones. In another embodiment in accordance with the invention, the emitter is a light source and the sensors are photodetectors. And in yet another embodiment in accordance with the invention, the emitter is a radio frequency (RF) transmitter and the sensors are RF receivers.

Each sensor sends a receive message to the processor when it receives a pulse. This step is shown in block 302. A sensor identifier that identifies the sensor sending the receive message is included in each receive message. A sensor associates a time with a receive message by including in the receive message the time at which the sensor received the pulse in an embodiment in accordance with the invention. In another embodiment in accordance with the invention, the processor associates a time with each receive message.

The processor calculates the position of the stylus on the screen using each sensor identifier and a respective associated time (block 304). The position of the stylus on the screen is calculated using TOA in an embodiment in accordance with the invention. In another embodiment in accordance with the invention, the position is calculated using the time differences of arrival along with the known locations of sensors, also known as TDOA.

A determination is then made at block 306 as to whether more receive messages have been received. The method returns to block 304 and repeats until the stylus stops emitting pulses. In practice, a stylus can emit single pulses or a series of pulses over a given period of time. By way of example only, a single pulse may be emitted when a user is selecting an icon displayed on the screen and a series of pulses may be emitted when a user is writing on the screen.

Figure 4:
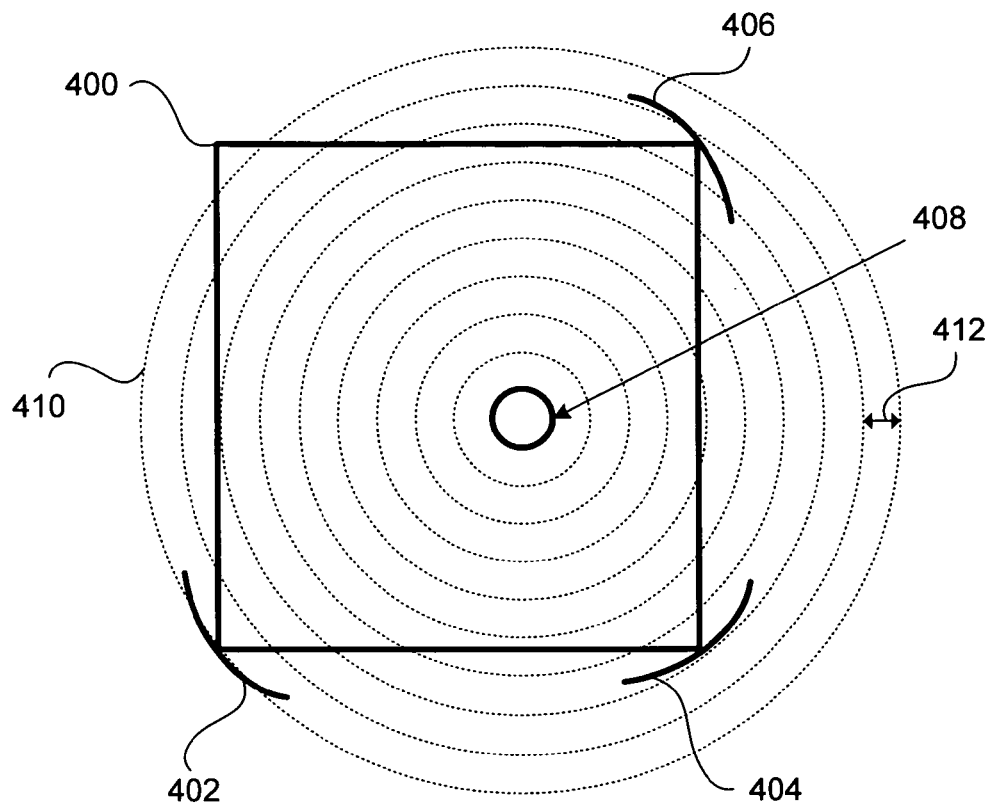
FIG. 4 illustrates a top view illustration of a first screen system that can implement the method shown in FIG. 3 in an embodiment in accordance with the invention.

Referring now to FIG. 4, there is shown a top view illustration of a first screen system that can implement the method shown in FIG. 3 in an embodiment in accordance with the invention. Touchscreen 400 includes sensors 402, 404, 406 that receive the pulses emitted from a stylus (not shown). Sensors 402, 404, 406 are implemented as microphones and the pulses as sound or ultrasonic pulses in an embodiment in accordance with the invention.

The stylus emits one or more pulses when the stylus touches position 408 on touchscreen 400. The number of pulses emitted over a given period of time is based on one or more factors. The factors include, but are not limited to, the desired level of accuracy, the speed of a clock used to determine the time delays, and the type of pulses emitted from the stylus (e.g., RF, sound, light).

When an ultrasonic pulse is emitted from the stylus, the sound radiates outward beginning at position 408. Circles 410 represent a position of an ultrasonic pulse as it radiates out from position 408. The distance 412 between each circle represents one clock pulse in an embodiment in accordance with the invention. In other embodiments in accordance with the invention, distance 412 can represent any given number of clock pulses. Factors that can influence the number of clock pulses between emitted pulses are the desired level of accuracy, the speed of a clock used to determine the time delays, and the type of pulses emitted from the stylus (e.g., RF, sound, light).

In the embodiment shown in FIG. 4, sensor 404 is the first sensor to receive the ultrasonic pulse 410, as it takes seven clock pulses for the ultrasonic pulse to travel from position 408 to sensor 404 (seven circles between position 408 and sensor 404). Sensor 406 is the next sensor to receive the ultrasonic pulse as it takes eight clock pulses to reach sensor 406. And finally, sensor 402 receives the ultrasonic pulse after nine clock pulses have passed.

Sensors 402, 404, 406 each transmit a receive message to a processor (not shown) when they receive pulse 410. As discussed earlier, the receive messages includes a sensor identifier that identifies the sensor sending the receive message. The sensor associates a time with a receive message by including in each receive message the time the sensor received the pulse in an embodiment in accordance with the invention. In another embodiment in accordance with the invention, a processor associates a time with each receive message.

The processor calculates the position of the stylus on the screen using each sensor identifier and a respective associated time. Position-determining methods known as TOA and TDOA can be used to calculate the location of position 408 on touchscreen 400.

Figure 5:
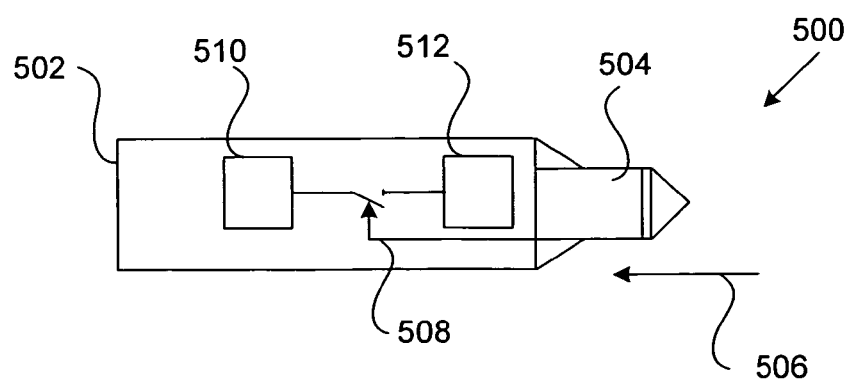
FIG. 5 depicts a graphical illustration of a stylus that can be used with the first screen system shown in FIG. 4.

FIG. 5 depicts a graphical illustration of a stylus that can be used with the first screen system shown in FIG. 4. Stylus 500 can be constructed differently in other embodiments in accordance with the invention. Stylus 500 includes body 502 and moveable tip 504. When a user presses tip 504 onto a touchscreen, tip 504 moves in the direction shown by arrow 506. This movement causes switch 508 to close, thereby allowing power source 510 to supply power to emitter 512. Emitter 512 emits one or more pulses in response to receiving power from power source 510. When tip 504 is removed from the touchscreen, tip 504 returns to its resting position, which results in the opening of switch 508. This effectively turns off emitter 512 and emitter 512 stops emitting pulses.

Figure 6A:
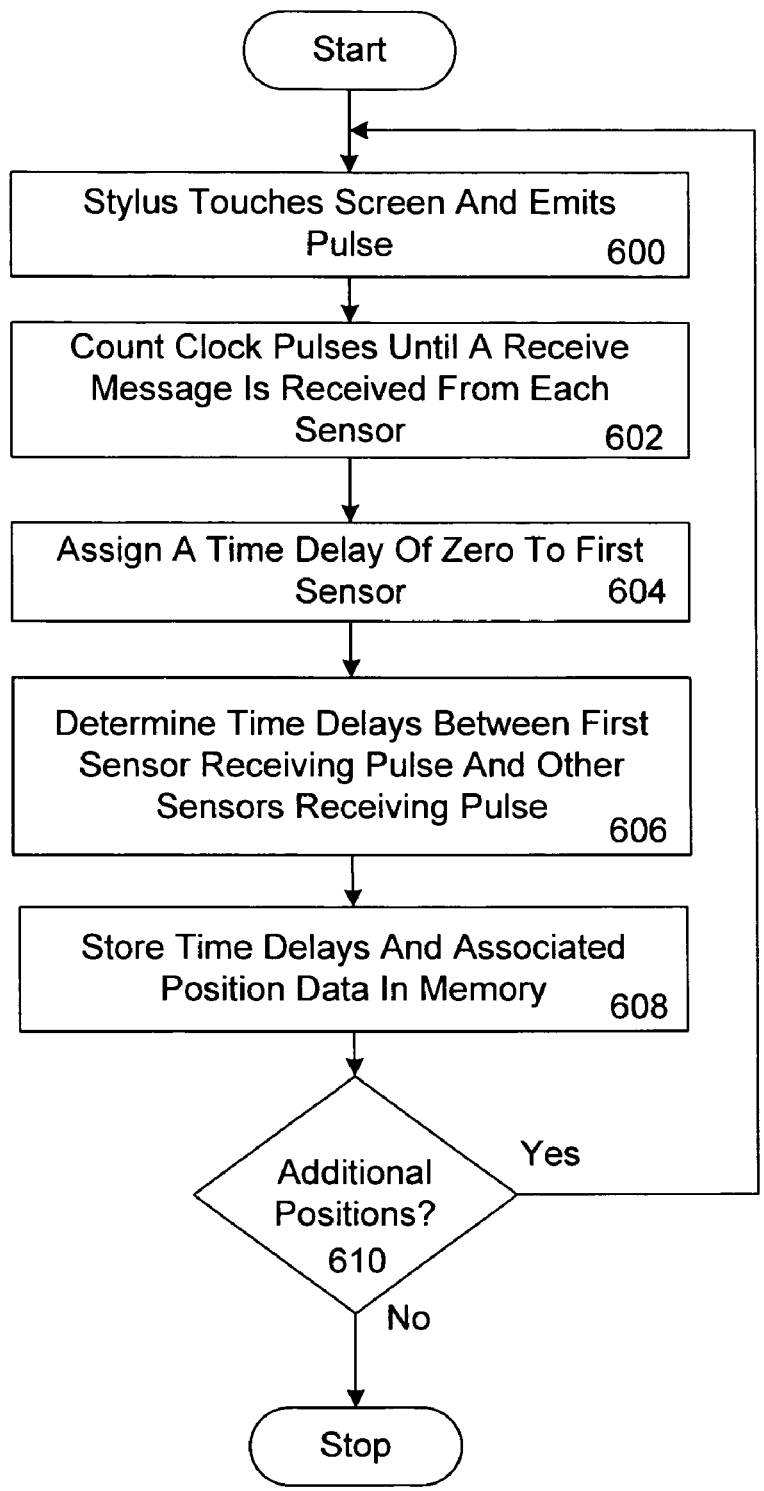
FIGS. 6A-6B illustrate a flowchart of a second method for screen navigation in an embodiment in accordance with the invention.
Figure 6B:
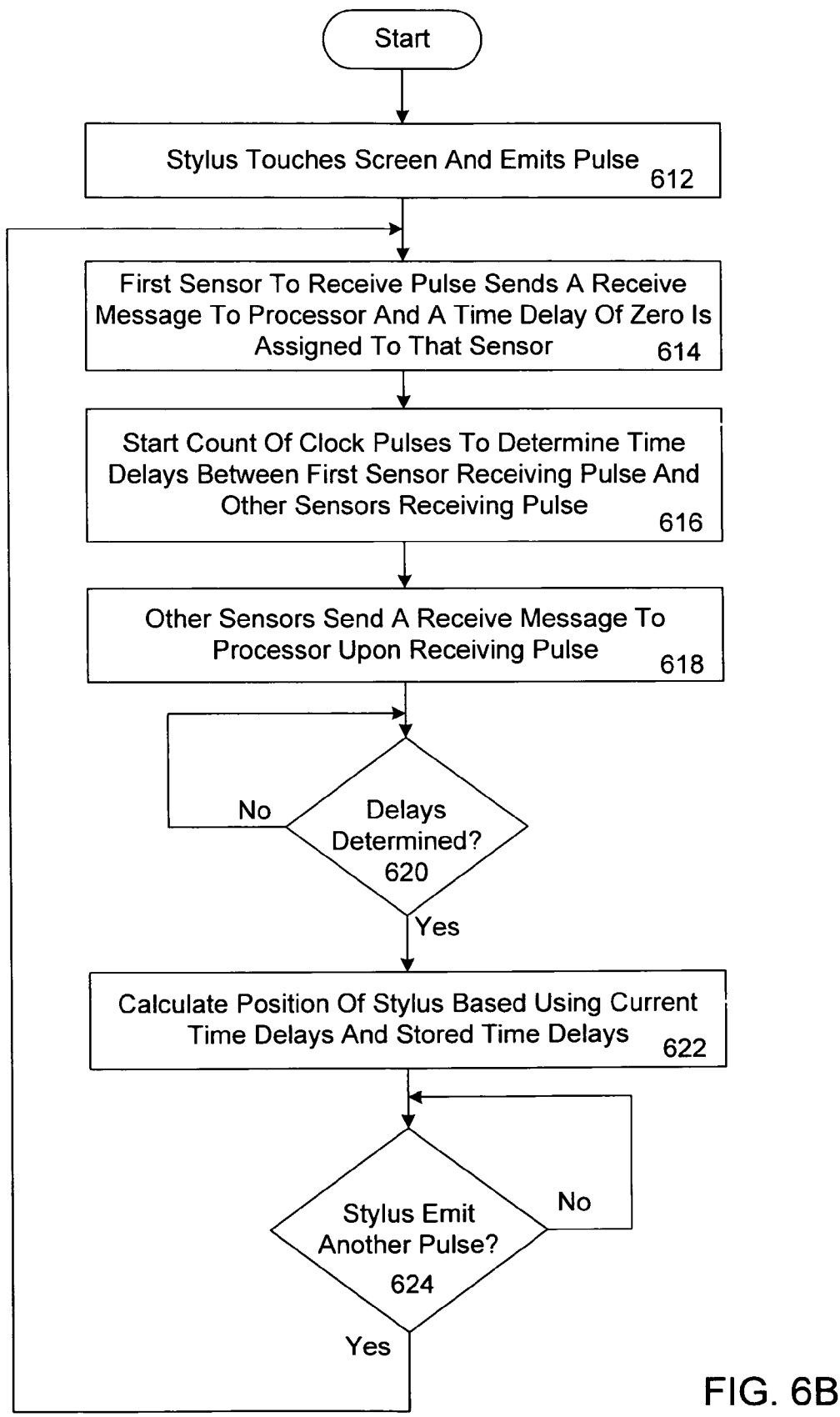

Referring now to FIGS. 6A-6B, there is shown a flowchart of a second method for screen navigation in an embodiment in accordance with the invention. The method depicted in FIG. 6A is performed by a touchscreen manufacturer while the method in FIG. 6B is executed when a user interacts with the touchscreen in an embodiment in accordance with the invention. Initially, a stylus touches a screen and emits a pulse, as shown in block 600. The stylus emits an ultrasonic pulse in an embodiment in accordance with the invention. In other embodiments in accordance with the invention, stylus emits a pulse of light or a radio frequency (RF) pulse.

A count of the clock pulses is then started and continued until a receive message is received from each sensor. This step is shown in block 602. The receive message includes a sensor identifier identifying which sensor sent the receive message in an embodiment in accordance with the invention.

The processor then assigns a time delay of zero to the sensor that first sent a receive message (block 604). Using the count of clock pulses, the processor determines a time delay between the time the first sensor received the pulse and the times the remaining sensors received the pulse (block 606). By way of example only, the processor determines the time delays by subtracting the clock count associated with the first sensor from the clock count associated with each other sensor in an embodiment in accordance with the invention.

The time delays and associated position data are then stored in memory, as shown in block 608. The position data includes the associated clock pulse counts in an embodiment in accordance with the invention. The time delays and associated counts of clock pulses are then stored in a lookup table in an embodiment in accordance with the invention. An exemplary entry in the lookup table is as follows:

| Time Delay For Sensor 1 | Time Delay For Sensor 2 | Time Delay For Sensor 3 | Sensor 1 Count | Sensor 2 Count | Sensor 3 Count |
|---|---|---|---|---|---|
| 2 | 0 | 1 | 9 | 7 | 8 |

Figure 7:
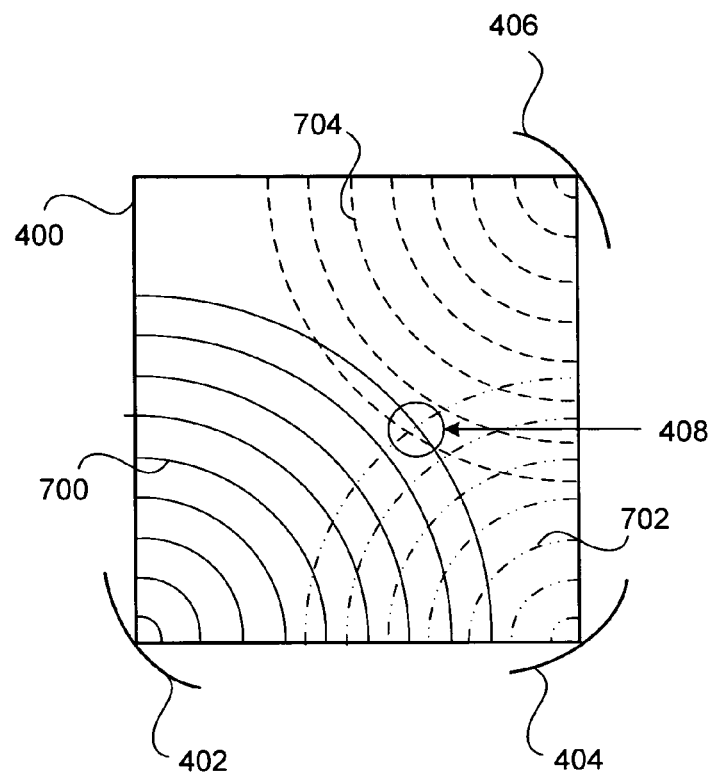
FIG. 7 depicts the top view illustration of the first screen system shown in FIG. 4 and the clock pulse counts for sensors 402, 404, 406 based on position 408.

Thus, a time delay of 2, 0, 1 corresponds to a clock count for each sensor of 9, 7, 8. The clock counts correspond to distances in an embodiment in accordance with the invention. FIG. 7 is used to describe the method shown in FIG. 6A in more detail.

In another embodiment in accordance with the invention, the position data includes the (x, y) coordinates and the time delays and associated (x, y) coordinates are stored in a lookup table in an embodiment in accordance with the invention. The (x, y) coordinates are based on the number of pixels in the display of the touchscreen, with the (0, 0) coordinates assigned to the upper left corner of the display in an embodiment in accordance with the invention. An exemplary entry in the lookup table is as follows:

| Time Delay For Sensor 1 | Time Delay For Sensor 2 | Time Delay For Sensor 3 | x Coordinate | y Coordinate |
|---|---|---|---|---|
| 2 | 0 | 1 | 650 | 982 |

Thus, a time delay of 2, 0, 1 corresponds to the coordinates of (650, 982).

A determination is then made at block 610 as to whether the stylus has touched a different position on the touchscreen. If so, the method returns to block 600 and repeats until all of the positions have entries in the lookup table. In this manner, a given number of different configurations of time delays are associated with clock pulse counts that are used to determine respective positions on a touchscreen.

As discussed earlier, the method depicted in FIG. 6B is executed when a user interacts with the touchscreen in an embodiment in accordance with the invention. Initially, a stylus touches a touchscreen and emits a pulse at block 612. The first sensor to receive the pulse transmits a receive message to the processor and a time delay of zero is assigned to that sensor (block 614). The processor then begins a count for each of the other sensors to determine a time delay between the first sensor receiving the pulse and each of the remaining sensors receiving the pulse (block 616). The other sensors transmit receive messages when each receives the pulse, as shown in block 618.

A determination is then made at block 620 as to whether all of the time delays have been determined. If not, the method waits until all of the time delays are determined and then passes to block 622. The position of the stylus on the touchscreen is then determined by looking up the clock pulses associated with the determined time delays (block 622).

A determination is then made at block 624 as to whether the stylus has emitted another pulse. If not, the process waits until another pulse is emitted. The method then returns to block 614 and repeats each time a pulse is emitted from the stylus.

Referring now to FIG. 7, there is shown the top view illustration of the first screen system shown in FIG. 4 and the clock pulse counts for sensors 402, 404, 406 based on position 408. The position-determining technique shown in FIG. 7 is known as hyperbolic positioning. Curves 700 represent the nine clock pulses counted between position 408 and sensor 402. Curves 702 represent the seven clock pulses counted between position 408 and sensor 404. And finally, curves 704 represent the eight clock pulses counted between position 408 and sensor 406. When a user places the stylus at position 408, the processor (not shown) determines the relative time delays for sensors 402, 404, 406 as 2, 0, 1 respectively.

The processor then uses the relative time delays to read the clock pulse counts associated with time delays of 2, 0, 1 from memory. In the embodiment shown in FIG. 7, the clock pulse counts associated with time delays of 2, 0, 1 are 9, 7, 8, respectively. Thus, the processor determines the location of the ninth hyperbolic for sensor 402, the location of the seventh hyperbolic for sensor 404, and the location of the eighth hyperbolic for sensor 406. The position where all three hyperbolas intersect is the location of the stylus on the touchscreen (e.g., position 408).

Figure 8:
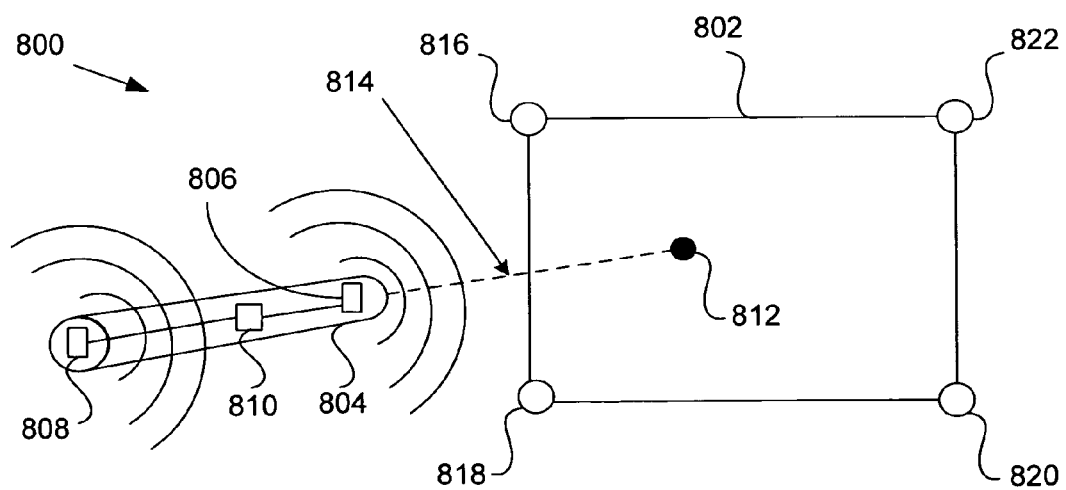
FIG. 8 is a perspective view of a second screen system in an embodiment in accordance with the invention.

FIG. 8 is a perspective view of a second screen system in an embodiment in accordance with the invention. Screen system 800 includes screen 802 and stylus 804. Stylus 804 includes emitters 806, 808 that emit, for example, pulses of sound, light, or RF pulses. Power source 810 provides power to emitters 806, 808. Emitters 806, 808 are manually activated by a power switch (not shown) that activates power source 810 in an embodiment in accordance with the invention. In another embodiment in accordance with the invention, power source 810 is included in a motion activation component that provides power to emitters 806, 808 upon movement of stylus 804.

Stylus 804 is pointing at position 812 on screen 802 while located a distance 814 away from screen 802. Distance 814 can be any given distance, beginning with zero when stylus 804 is touching screen 802. Sensors 816, 818, 820, 822 are used to determine the location of position 812 on screen 802. Sensors 816, 818, 820, 822 are synchronized in time in an embodiment in accordance with the invention. In another embodiment in accordance with the invention, sensors 816, 818, 820, 822 are not synchronized in time and a processor associates timing information to data received from sensors 816, 818, 820, 822.

The position-determining method includes first determining the locations of emitters 806, 808 in space. A line is then drawn between the two emitter locations and extends to screen 802. The intercept point of the line with screen 802 is then determined to identify position 812 on screen 802.

Figure 9:
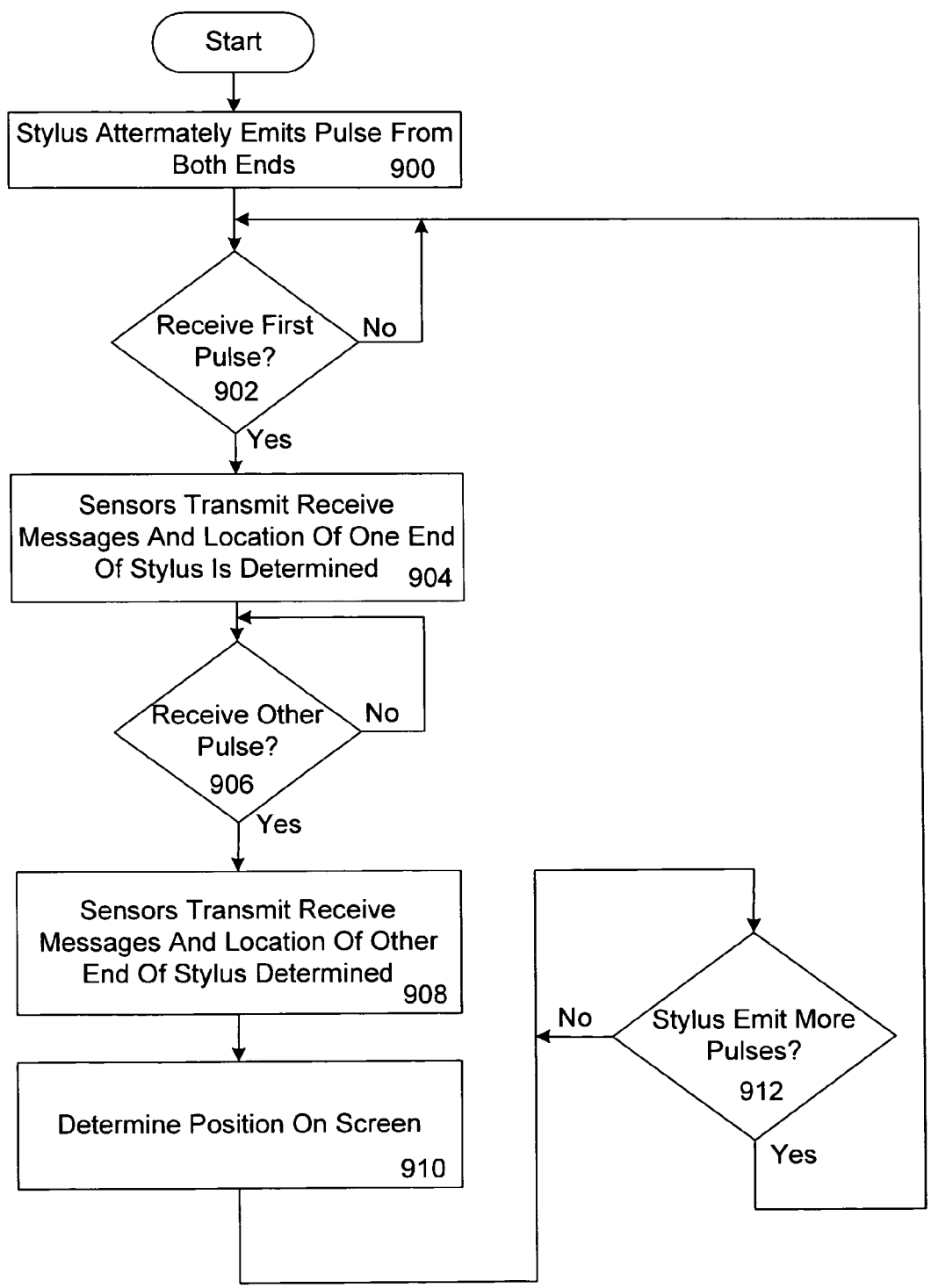
FIG. 9 is a flowchart of a third method for screen navigation that can be implemented in the second screen system shown in FIG. 8.

Referring now to FIG. 9, there is shown a flowchart of a third method for screen navigation that can be implemented in the second screen system shown in FIG. 8. Initially, a stylus alternately emits a pulse or series of pulses from both ends of the stylus, as shown in block 900. A determination is then made at block 902 as to whether the four sensors have received one of the pulses. If not, the method waits until the sensors have received the pulse. When the four sensors have received the pulse and transmitted receive messages to a processor (not shown), the location of one of the emitters in the stylus is determined (block 904) using TOA or TDOA in an embodiment in accordance with the invention.

Next, at block 906, a determination is made as to whether the other pulse has been received by the four sensors. If not, the process waits until the sensors have received the pulse. When the four sensors have received the pulse and transmitted receive messages to the processor, the location of the other emitter in the stylus is determined (block 908). The location of a position on the screen (e.g., 812 in FIG. 8) is then determined by drawing a line between the two emitter locations that extends to the screen and then determining the point where the line intercepts with the screen (block 910). A determination is then made as to whether another pulse has been emitted. If not, the method waits until an emitter emits a pulse. The process then returns to block 902 and repeats each time a pulse is emitted by one of the emitters.

Embodiments in accordance with the invention are not limited to the method shown in FIG. 9. Other embodiments can perform screen navigation differently. For example, the flowcharts shown in FIGS. 6A and 6B can be used with the second screen system depicted in FIG. 9.

The invention claimed is:

1. A screen system, comprising:
    a stylus comprising one or more emitters each operable to emit a pulse;
    a display;
    three or more sensors each operable to receive the pulse emitted by the one or more emitters and in response thereto transmit a receive message, wherein each receive message comprises an identifier identifying a respective sensor transmitting the receive message; and
    a processor connected to the display and to each of the three or more sensors and operable to receive a receive message generated when the pulse is first received by one of the three or more sensors, the processor being configured to count clock pulses until receive messages are received from the remaining two or more sensors to determine a time delay between the first sensor receiving the pulse and each of the remaining two or more sensors receiving the pulse, the processor being further configured to determine a position selected by the stylus using the determined time delays and a plurality of stored time delays for the three or more sensors, wherein position data defining a respective position on the display is associated with each of the stored time delays.

2. The screen system of claim 1, wherein the processor determines the position the stylus has selected within the image displayed on the display by calculating a relative time of arrival for each of the receive messages.

3. The screen system of claim 1, wherein the processor determines the position the stylus has selected within the image displayed on the display by calculating a relative time difference of arrival for each of the receive messages.

4. The screen system of claim 1, wherein the one or more emitters comprise one or more acoustical emitters and the three or more sensors comprise three or more microphones.

5. The screen system of claim 1, wherein the one or more emitters comprise one or more optical emitters and the three or more sensors comprise three or more photodetectors.

6. The screen system of claim 1, wherein the one or more emitters comprise one or more radio frequency (RF) transmitters and the three or more sensors comprise three or more RF receivers.

7. The system of claim 1, wherein the processor is further operable to identify the position on the display to which the stylus is pointing using a line drawn through the determined locations of first and second emitters of the stylus that intercepts with the display.

8. The screen system of claim 1, wherein the processor is configured to determine locations of first and second emitters of the stylus using the sensor identifiers and a time associated with each receive message, the processor being further operable to identify the position on the display to which the stylus is pointing using the determined locations of the first and second emitters of the stylus to estimate the position on the display.

9. A method for navigation in a screen system comprising a display, three or more sensors, and a stylus comprising one or more emitters that each emits a pulse that is received by the three or more sensors, the method comprising:
    a) emitting a pulse;
    b) generating a receive message when the pulse first received by one of the three or more sensors, wherein each receive message comprises an identifier identifying a respective one of the three or more sensors that received the pulse;
    c) counting clock pulses until receive messages are received from the remaining two or more sensors to determine a time delay between the first sensor receiving the pulse and each of the remaining two or more sensors receiving the pulse; and
    d) determining a position selected by the stylus using the determined time delays and a plurality of stored time delays for the three or more sensors, wherein position data defining a respective position on the display is associated with each of the stored time delays.

10. The method of claim 9, further comprising displaying an image.

11. The method of claim 9, wherein the screen system comprises a touchscreen system.

12. The method of claim 9, wherein the identifying includes identifying the position on the display to which the stylus is pointing using a line drawn through the determined locations of first and second emitters of the stylus that intercepts with the display.

13. The method of claim 9, wherein the determining comprises receiving the receive messages and determining the selected position by calculating a relative time of arrival using each receive message and a time associated with each receive message.

14. The method of claim 9, wherein the determining comprises receiving the receive messages and determining the selected position by calculating a relative time difference of arrival using each receive message and a time associated with each receive message.

15. The method of claim 9, further comprising repeating a) through d) each time a pulse is emitted from the one or more emitters.

16. The method of claim 9, further comprising identifying the position on the display to which the stylus is pointing using the determined locations of first and second emitters of the stylus to estimate the position on the display.

17. A method for navigation in a screen system comprising a display, three or more sensors, and a stylus comprising first and second emitters that each emits a pulse that is received by the three or more sensors, the method comprising:
    a) emitting the pulse from each of the first and second emitters of the stylus;
    b) generating a receive message when the pulse is first received by one of the three or more sensors, wherein each receive message comprises an identifier identifying a respective one of the three or more sensors that received the pulse;
c) counting clock pulses until receive messages are received from the remaining two or more sensors to determine a time delay between the first sensor receiving the pulse and each of the remaining two or more sensors receiving the pulse;
d) determining locations of the first and second emitters of the stylus using the determined time delays and a plurality of stored time delays for the three or more sensors, wherein position data defining a respective position on the display is associated with each of the stored time delays; and
e) identifying a position on the display to which the stylus is pointing using the determined locations of the first and second emitters of the stylus to estimate the position on the display.

18. The method of claim 17, further comprising repeating a) through e) each time a pulse is emitted from each of the first and second emitters.

19. The method of claim 17, wherein the identifying includes identifying the position on the display to which the stylus is pointing using a line drawn through the determined locations of the first and second emitters of the stylus that intercepts with the display.

* * * * *